3,018,168
PROCESS FOR PRODUCTION OF BARIUM SILICATES CONTAINING WATER-SOLUBLE BARIUM VALUES FROM BARITE
Manley C. Marcellus, Maplewood, Minn., and John A. Scarlett, Modesto, Calif., assignors to FMC Corporation, a corporation of Delaware
Filed Oct. 20, 1958, Ser. No. 768,140
6 Claims. (Cl. 23—186)

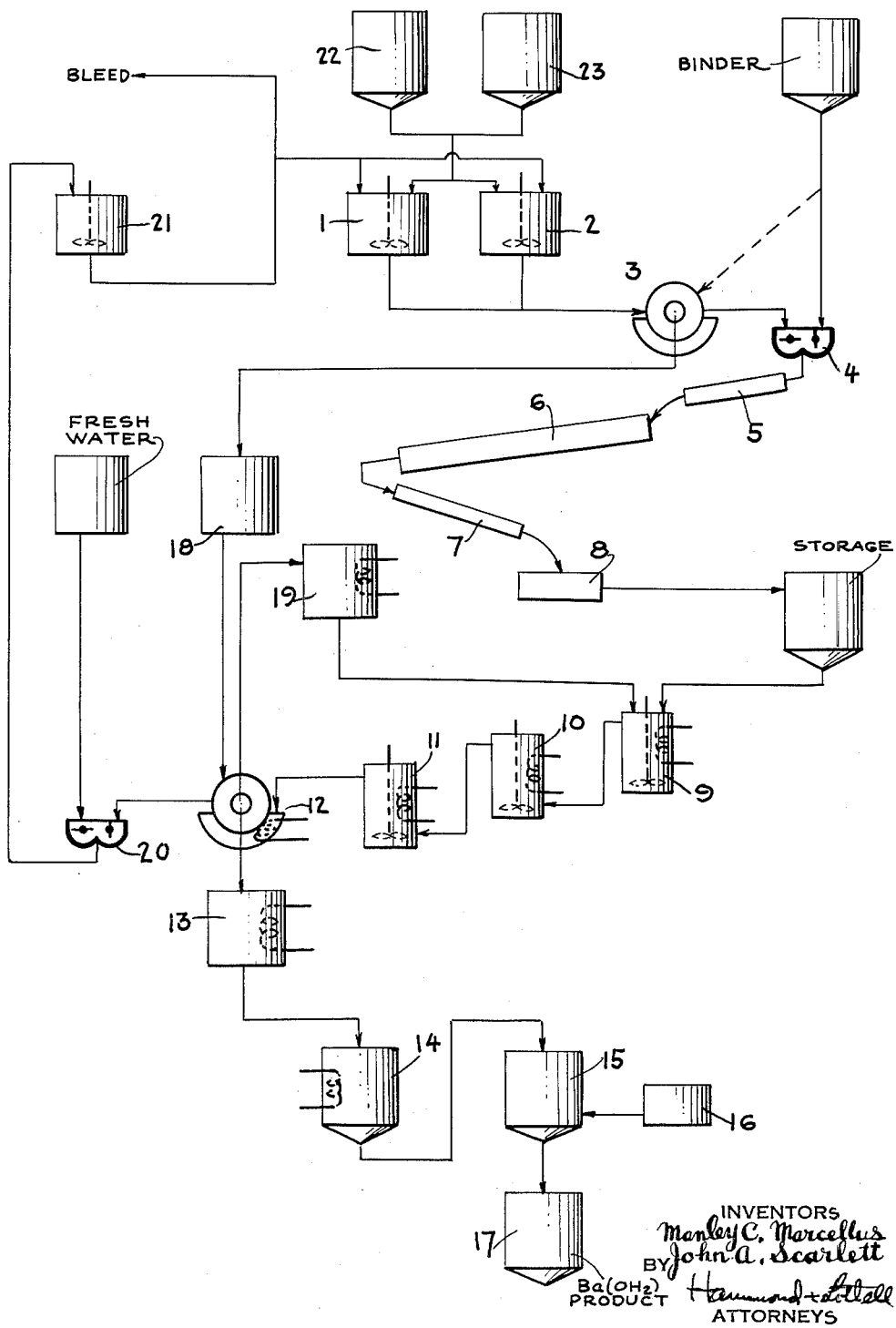

This invention relates to an improved process for obtaining water-soluble barium values as barium hydroxide from barite by the controlled reaction of barite with silica containing material to form a barium silicate, and the subsequent leaching of the barium silicate to obtain barium hydroxide solutions and water-insoluble barium metasilicate, which may be recycled.

In recent years there has been a rapidly growing market for barium oxide and barium hydroxide for the lubricating oil additive industry in addition to other expanding markets for the many other uses of barium oxide and barium hydroxide. Barium occurs naturally in commercially available quantities as barite, a barium sulfate mineral. A typical barite ore contains from 80% to 99% of $BaSO_4$, 0.4 to 12.5% $SiO_2$, 0.1% to 1.5% of $Fe_2O_3$ and $Al_2O_3$ in about 2:1 ratio, 0.4% to 2.5% CaO and the remainder mainly organics and water. The present commercial process for producing barium hydroxide or barium oxide from barite involves many operations and results in substantial production costs. The present process involves decomposing the barium sulfate by heating with coke in a rotary kiln to produce barium sulfide according to the following reaction:

$$BaSO_4 + 4C \rightarrow BaS + 4CO$$

The barium sulfide is leached from the kiln product and converted to $BaCO_3$ by metathesis with soda ash or carbon dioxide. The barium carbonate is decomposed with carbon to give barium oxide in an electric arc or fuel-fired furnace as follows:

$$BaCO_3 + C \rightarrow BaO + 2CO$$

The barium oxide is hydrated to obtain barium hydroxide.

It has been known for years that it is possible to decompose barite with silica to produce a barium silicate and if the barite is used in excess, barium orthosilicate ($2BaO.SiO_2$) or a polybarium silicate having a higher BaO content than the barium orthosilicate, such as $3BaO.SiO_2$ is produced. The excess of barium over that required to form barium metasilicate ($BaO.SiO_2$) can be leached from these silicates with water in the form of barium hydroxide according to the following typical equations:

$$2BaSO_4 + SiO_2 \rightarrow 2BaO.SiO_2 + 2SO_2 + O_2$$
$$3BaSO_4 + SiO_2 \rightarrow 3BaO.SiO_2 + 3SO_2 + \tfrac{3}{2}O_2$$
$$2BaO.SiO_2 + H_2O \rightarrow Ba(OH)_2 + BaO.SiO_2$$
$$3BaO.SiO_2 + 2H_2O \rightarrow 2Ba(OH)_2 + BaO.SiO_2$$

Such a process produces barium hydroxide from barite in a direct, two step operation. It has, however, not been commercially feasible to decompose barite by this method, up to the present time, due to the fact that the barium silicates produced tend to fuse at the temperatures required to decompose barium sulfate. While this presents no problem in laboratory operations, where the fused material can be handled, it was found that in commercial operations where rotary tube furnaces are customarily used, the mixture of barium sulfate and $SiO_2$ would fuse and ball, sticking to the sides of the kiln, requiring frequent shut-downs. If lower temperatures are used to avoid this, the conversion is markedly reduced. In attempts to overcome this tendecy to fuse at the decomposition temperatures of barium sulfate, it has been suggested to add many different materials to the kiln feed to lower the decomposition temperature or to raise the fusion temperature. Such additives, however, act as contaminants and interfere with the leaching of the barium silicates produced or act to greatly lower the yield of the product produced.

The present invention is designed to overcome these defects of the prior art and enable commercial production of barium silicate from barite and silica in rotary kilns without contamination of the barium silicate produced, without fusion and in high conversions. This barium silicate is readily leached to produce barium hydroxide.

It is an object of this invention to provide an improved process for the production of barium silicate containing water-soluble barium values from barite in high conversions.

A further object of this invention is to provide a process for the decomposition of barite with silicon dioxide containing materials which avoids sintering or fusion.

An additional object of this invention is to provide a commercially feasible process of decomposing barite directly to obtain barium hydroxide.

These and other objects of the invention will become readily apparent from the following description and claims.

We have found that barite can be decomposed with silicon dioxide containing materials without fusion and in high yields in continuous furnacing equipment, such as a rotary kiln, by the use of a critical controlled slightly reducing atmosphere in the kiln, so that only small amounts, up to 2% of BaS, but generally less than 0.5% of BaS, are formed in the kiln reaction product and by the use of a critical barium to silicon ratio of the kiln feed material of from 2.2 to 1 to 2.7 to 1. We have found, optionally, that conversions can be increased further, with a decrease in occurrence of fusion by pelletizing the kiln charge and by recycling the barium metasilicate produced by the leaching step, with provisions for a bleed to avoid build-up of contaminants. In addition, we have found that the kiln linings are seriously attacked in the hot zone and that the product produced is further contaminated by use of ordinary refractory linings and that a refractory lining containing 70% to 90% alumina with no free silica present is necessary to avoid this source of contamination.

The barium silicate process of our invention can utilize barite feeds of various qualities, but best barium efficiency is obtained when a relatively high-grade barite ore is used. The desirable kiln feed composition is a Ba/Si molar ratio of 2.5, or about 10% $SiO_2$ by weight of $BaSO_4$. A high-grade barite ore (93% or more $BaSO_4$) requires addition of a substantial amount of silica. This additional silica can be added as finely divided silica, diatomaceous earth or recycled barium metasilicate leach residue. The use of the leach residue permits recovery of most of the barium values in the leach residue.

The figure is a diagrammatic flow sheet of the commercial process for the recovery of barium values from barite ore.

Theoretically the reactions for the barium silicate process, utilizing recycled barium metasilicate, can be written as follows:

$$1.5BaSO_4 + BaO.SiO_2 \rightarrow 2.5BaO.SiO_2 + 1.5SO_2 + 0.75O_2$$
$$2.5BaO.SiO_2 + 1.5H_2O \rightarrow 1.5Ba(OH)_2 + BaO.SiO_2$$

In practice, however, complete decomposition of barite is not obtained, so that the leach residue contains some $BaSO_4$. Also, insoluble BaO is slightly in excess of the barium metasilicate ratio, due to combination with iron and alumina, and incomplete washing, so that the insoluble $BaO/SiO_2$ ratio is approximately 1.1. Typical reactions for a 94% $BaSO_4$ barite containing 5% $SiO_2$ and decomposed 77% would be as follows:

KILN REACTION $1.45BaSO_4+0.3SiO_2+0.23BaSO_4+0.7(1.1BaO.SiO_2) \longrightarrow$
barite    barite    residue    residue $(2.1BaO.SiO_2+0.4BaSO_4)+1.33SO_2+\frac{1.33O_2}{2}$
kiln product

LEACHING $(2.1BaO.SiO_2+0.4BaSO_4)+H_2O \longrightarrow$
(kiln product)
$Ba(OH)_2+1.1BaO.SiO_2+0.4BaSO_4$

LEACH RESIDUE RECYCLE AND BLEED $1.1BaO.SiO_2+0.4BaSO_4 \xrightarrow{70\%} 0.7(1.1BaO.SiO_2)+0.28BaSO_4$ (Recycle)

$\xrightarrow{30\%} 0.3(1.1BaO.SiO_2)+0.12BaSO_4$ (Bleed)

The 30% bleed of leach residue above is required to balance the $SiO_2$ entering in the barite ore. A higher grade barite ore would need less recycle bleed, resulting in higher barium efficiency.

EFFECT OF ATMOSPHERE

We have found that a closely controlled reducing atmosphere is required to obtain maximum reaction with minimum melting. This reducing atmosphere has been obtained by the combustion of natural gas with a deficiency of air. Control of the atmosphere composition within narrow limits is important because an excess of reducing components, i.e., $H_2$ and CO causes formation of some barium sulfide, while a deficiency decreases the reaction. When the atmosphere composition is optimum, the kiln product may have a trace of BaS. Material residing well within the interior of the kiln may contain considerable BaS, but this essentially reacts to form barium silicate before the material spills from the kiln. When the product contains a trace of BaS, this is oxidized upon cooling on contact with air.

The atmosphere is controlled by analysis of exhaust gas for reducing components $H_2$ or CO. The preferred $H_2$ or CO range is dependent upon conditions such as feed rate, fuel rate, etc. Broadly speaking for a variety of kiln conditions, the exhaust CO should be in the range 0.5–2.0%, and the exhaust $H_2$, 1.0–4.0% of the total exhaust gases. The optimum range for any particular set of conditions, however, is much narrower, for example, 2.0–2.5% $H_2$. The amounts of $H_2$ and CO are much greater in the hot zone than in the exhaust gas because these components are consumed by the reaction, however, the hot zone gas composition has not been determined accurately.

It should be noted that either $H_2$ or CO analysis can be used for atmosphere control. The relative proportions of $H_2$ and CO are fixed by the equilibrium of the reaction $CO_2+H_2 \rightleftharpoons CO+H_2O$. Equilibrium calculations show that the $H_2$:CO ratio in the hot zone should be about 0.5. However, the equilibrium shifts rapidly as the gases are cooled, so that the ratio becomes about 2.0 at 800°–900° C. Evidently the reaction becomes very slow after dropping below 1000° C. because in analyzing the products of combustion, the $H_2$:CO ratio is normally in the range 1.6–2.0.

The reducing components are believed to promote the reaction by reacting with $SO_2$ and $O_2$ formed from the normal decomposition reaction. The reaction may also be promoted by formation of some BaS at an intermediate stage in the kiln. Several or all of the following reactions might apply:

(a) $xBaSO_4+SiO_2 \longrightarrow xBaO.SiO_2+xSO_2+\frac{x}{2}O_2$ (b) $BaSO_4+4H_2 \rightarrow BaS+4H_2O$ (c) $BaSO_4+4CO \rightarrow BaS+4CO_2$ (d) $3BaSO_4+BaS \rightarrow 4BaO+4SO_2$ (e) $xBaO+SiO_2 \rightarrow xBaO.SiO_2$ (f) $SO_2+3H_2 \rightarrow H_2S+2H_2O$ (g) $SO_2+H_2+2CO \rightarrow H_2S+2CO_2$ (h) $O_2+2H_2 \rightarrow 2H_2O$ (i) $O_2+2CO \rightarrow 2CO_2$ It has been found that under an oxidizing atmosphere the decomposition is materially decreased and under a highly reducing atmosphere fusion readily occurs perhaps due to formation of a BaS eutectic; it was totally unexpected that a carefully controlled slightly reducing atmosphere would result in good decomposition with no fusion.

The effect of oxidizing vs. reducing atmosphere is illustrated in Table I by a test in a laboratory gas-fired furnace at 1600° C.

Table I

| | Oxidizing Atmosphere (3–4% $O_2$) | Reducing Atmosphere (.7–.9% CO) |
|---|---|---|
| Water-soluble BaO, percent | 11.0 | 33.0 |
| Acid-soluble BaO, percent | 51.5 | 80.3 |
| Total $BaSO_4$ decomposed, percent | 55.7 | 88.0 |

Tests at 1450° C. in a laboratory electric tube furnace with synthetic atmospheres (Table II) show an improvement in decomposition for a neutral atmosphere over an oxidizing (air) atmosphere, and for a reducing atmosphere over a neutral atmosphere.

Table II

| Mol Ratio, $BaO:SiO_2$ | Decomposition of $BaSO_4$, percent | | |
|---|---|---|---|
| | Air | $N_2$ | 5% CO, 95% $N_2$ |
| 2:1 | 57 | 69 | 73 |
| 3:1 | 39 | 44 | 51 |

In the above examples, only CO was the reductant.

A further indication of the improvement in yield of water-soluble $Ba(OH)_2$ to be obtained by use of an optimum reducing atmosphere, is indicated by the following analyses of samples taken at 1450° C.

Table III

| | | |
|---|---|---|
| Percent CO in combustion atmosphere | 0.1 | 0.5 |
| Percent water-soluble BaO in sample | 15 | 47 |
| Percent BaS in sample | 0 | 0 |

A further example is shown in the following rotary kiln test. With CO at about 0.4% level, decomposition was about 76% and BaS about 0.8%. An increase in CO to about 0.8% caused the BaS to increase to 5–6%. In correcting the control, the CO was inadvertently dropped to about 0.2%, and the decomposition dropped to about 50% with no BaS. Optimum atmosphere was then found at about 0.4–0.5% CO, with 82% decomposition.

In a large-scale rotary kiln test, the optimum exhaust gas atmosphere was found to be about 1.4–1.8% CO (3.0–3.5% $H_2$) for a relatively low production rate, and about 1% CO (2% $H_2$) for a high production rate.

EFFECT OF Ba/Si RATIO

As stated above, to further avoid sintering or fusion it is necessary to control the ratio of barium to silicon within narrow limits. The operable range when operating at a kiln temperature of 1400° C. to 1500° C. has been found to be between 2.2 to 1 and 2.7 to 1. The following tables illustrate the criticality of this ratio under various conditions of temperature and feed ingredients in a tube furnace.

Table IV

| Ba/Si Ratio | Sintering Notes | | |
|---|---|---|---|
| | 1,450° C. | 1,500° C. | 1,550° C. |
| 1. Barite+99%SiO₂ | | | |
| 4.5 | | much | |
| 4.0 | much | do | |
| 3.4 | slight | slight | |
| 3.0 | v. slight | v. slight | slight. |
| 2.7 | none | none | none. |
| 2.4 | do | do | Do. |
| 2.2 | | do | Do. |
| 2. Barite+96%SiO₂ | | | |
| 2.0 | | none | slight. |
| 1.9 | | do | Do. |
| 3.1 | | slight | Do. |
| 2.9 | | none | none. |
| 2.7 | | do | Do. |
| 3. Barite+Leach Residue | | | |
| 3.5 | slight | much | |
| 3.1 | do | do | |
| 3.0 | do | slight | |
| 2.9 | do | do | |
| 2.7 | none | v. slight | |
| 2.5 | do | none | |
| 2.0 | slight | slight | |

Table V.—Batch kiln tests—Barite and Silex (98.9% SiO₂)

| Ratio | Percent Decomposition | | Sintering Notes |
|---|---|---|---|
| | 1,450° C. | 1,500° C. | |
| 3.0 | 85 | | Large spheres at 1,450°—discontinued. |
| 2.8 | 81 | | Slight sticking at 1,450°. |
| 2.8 | 85 | 89 | Slight sticking at 1,450°—Balls at 1,500°. |
| 2.7 | 92 | 100 | No sticking. |
| 2.7 | 88 | 95 | Do. |
| 2.5 | 88 | | Do. |
| 2.5 | 90 | 98 | Do. |

The barite utilized in the above tests contained about 96% BaSO₄ and was mainly −50 mesh in size. Silica flours containing 99% SiO₂ and 96% SiO₂ were used in the above tables as indicated; both grades were −200 mesh in size. The leach residue is a recycled barium metasilicate after being leached of water-soluble barium values. This recycled barium metasilicate was quite finely divided having an ultimate particle size of about 2 microns.

The mechanism which causes melting with Ba/Si ratios above 2.7 is not understood at this time. Melting has been found to occur characteristically at about 1400° C., but decreases again as the temperature increases. Melting is associated with higher than normal BaS in the hottest zone. This indicates that the melting may be due to a eutectic with BaS or possibly with free BaO which is not combined with silica in a barium silicate composition, or possibly both.

In any event by the control of the kiln atmosphere and the ratio of barium to silicon, both formation of BaS and BaO may be minimized and melting avoided. By the utilization of these improvements, it is possible to obtain conversions of 90% to 100% while operating at temperatures of from 1400° C. to 1500° C. Operation at the lower temperature is sufficient if recycled water-insoluble barium metasilicate or finely-divided diatomaceous earth is used as the source of the silicon dioxide containing material.

Further improvements in controlling and eliminating fusion and sintering can be obtained by the recycling of the insoluble barium metasilicate obtained from the leaching step and the step of utilizing finely divided ingredients as kiln feed and pelletizing them.

Pelletization is also desirable to reduce dusting which is particularly a problem when utilizing recycled barium metasilicate as a source of silicon dioxide. Pelletization, moreover, causes a uniform turnover of the bed in the kiln which promotes uniformity in temperature and intimate contact between the reducing gas and the solids, thus local conditions of extreme nature are avoided.

EFFECT OF RECYCLING WITH BLEED

The use of a recycled barium metasilicate obviously saves barium values which can be subsequently reprocessed. In addition, conversions are more complete at lower temperatures as compared to use of silica flour. Table VI shows the improvement in decomposition of barite when utilizing recycled leached barium metasilicate over use of −200 mesh silica when the barium/silicon ratio is 2.5.

Table VI

| Temperature | Percent Decomposition | |
|---|---|---|
| | Recycled Leach Residue | Silica Flour |
| 1,350° C. | 77 | 51 |
| 1,400° C. | 89 | 76 |
| 1,450° C. | 95 | 91 |

We have found, however, that if a continuous and complete recycle of barium metasilicate leach residues is utilized, a rapid build-up of impurities, and especially of Fe₂O₃ occurs. If more than 2% of Fe₂O₃ is present in the kiln product, the amount of barium values which can be leached from the barium silicate is greatly reduced. In Table VII, the result of a build-up of Fe₂O₃ on the percent of water-soluble barium recovered is demonstrated. The kiln feed was a 2.5 ratio of Ba/Si and the temperature was 1450° C.

Table VII

| Percent Fe₂O₃ | Percent Water-Soluble Ba | Percent Decomposition |
|---|---|---|
| 0.6 | 45.9 | 96 |
| 2.7 | 39.7 | 97 |
| 5.2 | 34.2 | 99 |

Sufficient bleed of the recycled leach residue must be provided to maintain the Fe₂O₃ content of the kiln feed below 2%. This can usually be done by normal operation since barite ordinarily has a 2.5% or greater amount of silica content and requires less than a complete recycle to build up the required silicon content to a 2.5 Ba/Si ratio. However, when using a low silica barite, some of the recycled barium silicate leached residue must be replaced by other sources of silica. Normally discarding about 10–30% of the recycle silica is sufficient to keep the Fe₂O₃ content of the kiln feed below 2%.

EFFECT OF PELLETIZATION

We have found that the particle size of the kiln feed material affects the amount of water-soluble barium produced by the reaction at 1450° C. as is shown by the following table:

Table VIII

| Mesh Size | Percent Water-Soluble Barium |
|---|---|
| −10 | 39 |
| −50 | 45–50 |
| −100 | 45–50 |

The coarser −10 mesh also sintered somewhat at operating temperatures. This optimum finely divided kiln feed material, however, tends to dust, flow unevenly and separate somewhat into its components when introduced into a rotary kiln furnace.

To overcome these defects we have found it necessary to pelletize the kiln feed. This pelletizing operation can be performed in any way that gives satisfactory agglomeration. The use of a binder is preferable, although the kiln feed mixture of finely divided barite and water leached barium metasilicate residue will agglomerate somewhat without a binder. We have found that binders such as the calcium lignosulfonate waste product from the wood pulp industry in slurry form, magnesium sulfate, magnesium chloride and sodium silicate are all extremely effective at a 1% to 2% level. The pellets can be prepared by adding the binder to the wet filter cake obtained by filtering a slurry of barite and silicon dioxide containing materials (preferably water leached barium metasilicate residue), mixing the binder with the wet filter cake and pelletizing by feeding the wet filter cake to either a rotating tube pelletizer or an inclined pan pelletizer. The pellets can be dried or fed directly into the kiln in a moist state. We have also found that the wet filter cake containing binder can be fed directly into the rotary kiln, if the kiln is rotating with sufficient speed, a pelletizing action occurs at the back end of the kiln.

While the size of the pellets produced is not critical, we prefer to use pellets in the size range of ½ to ¾ inch for best results in rotary kiln operation. Table IX discloses screen analysis for two batches of pellets prepared from barite ore in an inclined axis pelletizer and dried, along with the screen analysis of the fired kiln product. A 1.2% calcium lignosulfonate binder was utilized in preparing the pellets. The 30" diameter kiln was rotated at 0.5 r.p.m. and the hot zone temperature was 1530° C.

*Table IX.—Feed and product screen analyses*

|  | Screen Analysis, Percent | | | |
|---|---|---|---|---|
|  | +¾" | +½" | +¼" | −¼" |
| Feed #1 | 17 | 79 | 97 | 3 |
| Feed #2 | 12 | 62 | 93 | 7 |
| Product #1 | 7 | 55 | 87 | 13 |
| Product #2 | 2 | 13 | 48 | 52 |

From the above data it can be seen that the pellets are mainly over ¼ inch in size and that they hold up very well during their progress through the rotary kiln. The difference in breakdown is due to retention time in the kiln. Considerable difficulty was encountered when feed of a −¼" pellet size was utilized as some sticking occurred.

EFFECT OF REFRACTORY LINING

We have also found that use of a proper refractory lining material for the kiln is critical to optimum commercial operation of the process of producing water leachable barium values from barite by decomposition with $SiO_2$ containing materials. Fire clay refractories of about 40% alumina and sillimanite refractories of 60% alumina were found to react excessively with barium silicate materials. Linings of 70% alumina (Arco-70) were found to form a thin reaction coating and resist penetration at temperatures of 1550° C., with slightly more attack occuring at 1600° C. Linings of 80, 85 and 90% alumina were found to have good resistance at both temperatures. A test of 99% alumina brick was not as satisfactory due to cracking of the bricks.

We have discovered that a refractory lining of 70% to 90% alumina, mullite, or mixtures of the two, is satisfactory for containing the reaction, even in the event of melting. We have found that the presence of appreciable free silica in the lining cannot be tolerated, since this is attacked by barium compounds to form low-temperature melts of barium silicate, such as the $$BaO.SiO_2—2BaO.3SiO_2$$

eutectic at 1430° C., and the $BaO.2SiO_2—SiO_2$ eutectic at 1375° C. Alumina brick containing 70% to 90% $Al_2O_3$ have been found satisfactory, including electric furnace mullite brick having a composition $3Al_2O_3.2SiO_2$ (72% alumina). It is essential that the $Al_2O_3.SiO_2$ mol ratio be no less than 1.5, since free silica appears below this ratio. The following analyses are given to show satisfactory and unsatisfactory brick compositions which have been tested.

|  | Brick A (Satisfactory) | Brick B (Unsatisfactory) |
|---|---|---|
| $Al_2O_3$, percent | 73.1 | 61.2 |
| $SiO_2$, percent | 19.1 | 30.5 |
| $Al_2O_3:SiO_2$ mol ratio | 2.2 | 1.2 |

In practice, using 70%–90% $Al_2O_3$ brick lining, a thin reaction coating is formed on the surface of the bricks, which effectively prevents penetration and further reaction. Basic refractories, such as magnesia, chrome, or mixtures of the two, do not react seriously, but are easily penetrated by a melt. This penetration causes damage to the brick upon cooling.

In the figure there is shown a diagrammatic flow sheet of the preferred embodiment of our process of producing barium hydroxide by the decomposition of barite ore with silicon dioxide with subsequent leaching. The leach residue is slurried with barite (−50 mesh) in kiln feed mix tanks 1 and 2 in a ratio of 2.5 barium to 1 silicon. This slurry is then filtered by filter 3. The moist feed is then mixed with a binder (calcium lignosulfonate) in pug-mill 4. The moist feed with binder is then pelletized in pelletizer 5 and the pellets are fed into rotary gas-fired kiln 6. This kiln is lined in the hot zone with a 70% to 90% alumina brick and has means to regulate the temperature and atmosphere. After calcining, the barium silicate product is cooled in cooler 7 and ground in mill 8. The barium silicate is then run into continuous leach tanks 9, 10 and 11 maintained at 80° C. The barium silicate feed and the weak leach liquor containing 6–10% BaO are fed into leach tank 9 in such a manner that the concentration of BaO in the leaching liquor is always 20% BaO or higher. The overflow slurry from leach tank 9 flows through leach tanks 10 and 11 where the leaching continues. The concentration of leach liquor in leach tank 10 is about 25% BaO and in leach tank 11, about 30% BaO. The total residence time in the three leach tanks is about one hour. From leach tank 11 the slurry containing leached barium silicate and about a 30% BaO concentration leach liquor is filtered to separate the solids from the barium hydroxide solution in filter 12 which is maintained at 80° C. The 30% BaO leach liquor is stored in tank 13. The water content of this liquor is reduced in evaporator 14 to give a liquor having a BaO concentration of at least 50%. This concentrated liquor is quite pure and no crystallization or purification steps are necessary to rid it of impurities. The concentrated liquor is dried in spray drier 15 through which heated gas is run. This gas is heated in heater 16. Dry barium hydroxide is produced and stored in 17. Care must be taken in the leaching, evaporating and drying steps to exclude $CO_2$ which, if present, readily forms $BaCO_3$ from the barium present in the barium hydroxide solutions.

The leached barium silicate in filter 12 is washed with wash water from wash water tank 18. The water filtered from the barite-leach residue slurry at filter 3 is utilized as this wash water. This washing frees the leached barium silicate of adhering concentrated barium hydroxide solution and the resulting wash water contains from 6 to 10% of BaO. This wash water is stored in weak liquor tank 19 and is utilized as the weak leach liquor fed into leach tank 9. The moist filter cake from filter 12 is slurried in pug-mill 20 with fresh water and pumped to leach residue storage tank 21 where it is stored until it is recycled to kiln feed mix tanks 1 and 2 to be mixed with more barite from barite storage tanks 22 and 23. A portion of the leach residue slurry is bled as shown in order to keep the $Fe_2O_3$ content of the barium silicate kiln product below 2%.

The following examples are given as an illustration of the practice of the invention and to enable others skilled in the art to understand our invention more completely. It is understood, however, that the present invention is not limited to the illustrative examples.

EXAMPLE I

Barite ore obtained from Missouri and analyzing 96.5% $BaSO_4$, 2.5% $SiO_2$ and 0.5% $Fe_2O_3$ was ground to —100 mesh by a hammer-mill and mixed with silica flour (—200 mesh, 96.2% $SiO_2$). 2% of a 50% calcium lignosulfate slurry in the form of a 12.5% solution was sprayed on the dry powder and the whole mixed in a pug-mill. The amount of barite and silica flour was adjusted so that the mixture contained a Ba/Si ratio of 2.5 to 1.

This mixture was fed into a rotary kiln 35' long with a ½" pitch per foot and a 30" shell diameter lined with a 70% alumina refractory brick 4½" thick. The kiln was fitted with a device to control the rate of admission of air so that the proper atmospheric control within the kiln could be maintained and a gas burner burning natural gas was used to fire the kiln. The material exit of the rotary kiln was a spill gate adjustable to allow only product to flow through. The exhaust gases from the kiln were continuously analyzed, and the gas and air adjusted to maintain an exhaust gas concentration of hydrogen of 2% to 2.5% and a temperature in the hottest zone of 1400° C. to 1450° C.

The mixture was fed into the kiln at a rate of 150 lbs/hr. and pelletization occurred in the back end of the kiln. In this example the kiln was operated continuously for a period of five days.

The decomposition of barite averaged 80%. The barium silicate product produced was leached with a concentrated barium hydroxide solution having at least a 15% initial BaO concentration and the water-soluble barium values recovered. The residue consisted of a barium metasilicate having a barium to silicon ratio of 1.1 to 1 and undecomposed $BaSO_4$. These ingredients were present in a molar ratio of 0.3 mol of $BaSO_4$ and 1.1 mols of barium metasilicate.

EXAMPLE II

The same procedures as in Example I were followed, except the feed was a mixture of leached barium metasilicate as obtained from Example I and barite. A continuous operation was effected by recycling 87% of the leached barium metasilicate and adding sufficient 96.5% barite to bring the barium silica ratio to 2.5 to 1. This feed composition was attained as follows:

Mols of barium present
From fresh barite _____ 1.28
From undecomposed recycled $BaSO_4$ _____ 0.26
From recycled barium metasilicate _____ 0.96
                                                 2.50

Mols of silicon present
From $SiO_2$ content of fresh barite _____ 0.13
From recycled barium metasilicate _____ 0.87
                                                 1.00

A constant recycle of the leached barium metasilicate was employed with a 13% bleed to avoid build-up of $Fe_2O_3$. There was obtained in this continuous operation a yield of 1 pound of $Ba(OH)_2$ for every 1.72 pounds of barite ore used for a recovery of 82% of the BaO present in the barite ore.

In both examples the kiln lining remained free of attack and the material within the kiln remained free-flowing and free from sintering, fushion or balling.

While we have illustrated various specific embodiments of our invention, it will be readily apparent to one skilled in the art that the process herein described is not limited to these embodiments and that various changes and modifications may be made without departing from the spirit of the invention or the scope of the appended claims.

We claim:

1. A continuous process for the production of water-soluble barium values from barium sulfate containing ore comprising mixing barium sulfate containing ore with sufficient silicon dioxide containing material so that a ratio of barium to silicon of between 2.2 to 1 and 2.7 to 1 is maintained in the mixture, continuously feeding said mixture to a calcining zone maintained at a temperature from about 1400° C. to about 1500° C. in the presence of a slightly reducing atmosphere so that only small amounts up to 2% of barium sulfide are formed in the barium silicate reaction product, continuously removing said barium silicate reaction product from the calcining zone, leaching the water-soluble barium values from the barium silicate reaction product, separating the water-insoluble barium silicate residue and recycling the said water-insoluble barium silicate residue as a source of said starting silicon dioxide containing material.

2. The process of claim 1 wherein the barium sulfate containing ore is reduced to a —50 mesh particle size and the silicon dioxide containing material is reduced to a —200 mesh particle size and the feed mixture is pelletized before calcining.

3. The process of claim 1 wherein sufficient of said recycled water-insoluble barium silicate residue is discarded so that the $Fe_2O_3$ content of the barium silicate reaction product is maintained below 2% by weight.

4. The process of claim 1 wherein said feed mixture is calcined in contact with a refractory lining containing from 70% to 90% alumina and no free silica.

5. The process of claim 1 wherein said reducing atmosphere is controlled so that up to 0.5% of barium sulfide is formed in the barium silicate reaction product.

6. A continuous process for the production of water-soluble barium values from barium sulfate containing ore comprising mixing barium sulfate containing ore reduced to a —50 mesh particle size with sufficient silicon dioxide containing material reduced to a —200 mesh particle size so that a ratio of barium to silicon of between 2.2 to 1 and 2.7 to 1 is maintained in the mixture, pelletizing the mixture, continuously feeding said mixture to a calcining zone maintained at a temperature from about 1400° C. to about 1500° C. and in the presence of a slightly reducing atmosphere so that only small amounts up to 0.5% of barium sulfide are formed in the barium silicate reaction product, said mixture in said calcining zone being in contact with a refractory lining containing from 70% to 90% alumina and no free silica, continuously removing said barium silicate reaction product from the calcining zone, leaching the water-soluble barium values from the barium silicate reaction product, separating the water-insoluble barium silicate residue and recycling the said water-insoluble barium silicate residue as a source of said starting silicon dioxide containing material, while discarding sufficient of said recycled water-insoluble barium silicate residue so that $Fe_2O_3$ content of the barium silicate reaction product is maintained below 2% by weight.

References Cited in the file of this patent

UNITED STATES PATENTS

| | | |
|---|---|---|
| 1,490,769 | Deguide | Apr. 15, 1924 |
| 1,869,454 | Wittouck | Aug. 2, 1932 |
| 1,884,796 | Meade et al. | Oct. 25, 1932 |
| 2,735,751 | de Jahn | Feb. 21, 1956 |